(12) United States Patent
Hill et al.

(10) Patent No.: US 6,732,242 B2
(45) Date of Patent: May 4, 2004

(54) EXTERNAL BUS TRANSACTION SCHEDULING SYSTEM

(75) Inventors: David L. Hill, Cornelius, OR (US);
Paul D. Breuder, Hillsboro, OR (US);
Robert J. Greiner, Beaverton, OR (US);
Derek T. Bachand, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 10/113,546

(22) Filed: Mar. 28, 2002

(65) Prior Publication Data

US 2003/0188107 A1 Oct. 2, 2003

(51) Int. Cl.[7] .............................................. G06F 13/00
(52) U.S. Cl. ...................................................... 711/158
(58) Field of Search ................................. 711/150, 151, 711/158

(56) References Cited

U.S. PATENT DOCUMENTS 6,216,208 B1   4/2001   Greiner et al.
6,334,159 B1 * 12/2001   Haupt ............................ 710/6

FOREIGN PATENT DOCUMENTS

WO   WO01/48617 A2   7/2001
WO   WO01/48618 A2   7/2001

OTHER PUBLICATIONS

U.S. patent application Ser. No. 09/212,291, filed Dec. 16, 1998, pending.
U.S. patent application Ser. No. 09/474,010, filed Dec. 28, 1999, pending.
U.S. patent application Ser. No. 09/474,011, filed Dec. 28, 1999, pending.

* cited by examiner

Primary Examiner—Kevin L. Ellis
(74) Attorney, Agent, or Firm—Blakely, Sokoloff, Taylor & Zafman LLP

(57) ABSTRACT

A transaction management system is described for scheduling requests on an external bus. The system includes a number of queue registers to store requests and a controller coupled to queue registers to schedule external bus transactions for an agent that processes read requests, prefetch requests and write requests. The controller posts at least one write request to an external bus every defined number of transactions if at least one non-posted write request is stored in the queue registers.

26 Claims, 7 Drawing Sheets

EXTERNAL BUS TRANSACTION SCHEDULING SYSTEM

BACKGROUND

FIELD

Embodiments of the invention relate to microprocessors, and more specifically, to a system and method of scheduling bus transactions.

BACKGROUND

Modern computer systems generally include multiple agents, such as microprocessors, storage devices, display devices, input/output devices and/or other integrated circuits that process data requests. The multiple agents communicate over an external bus. The external bus operates to transfer address, data and control signals between these agents.

In multi-agent systems, the bandwidth of the external bus can define a limit to system performance. Clock speeds within an agent typically are much faster than clock speeds of the external bus. A processor core for example can issue many data requests (e.g., read and write requests) in the time the external bus can execute a single request. Further, an agent must share the external bus with other agents. These factors can introduce unwanted latency to the processing of data requests within an agent.

Microprocessors may process core read requests, prefetch requests and write requests. Core read requests are requests for addressed data to be read to the agent's processing core. Typically, core read requests identify data for which the agent has an immediate need. Prefetch requests, by contrast, refer to data that is likely to be used by the core in the not-so-distant future. By prefetching the data into the agent prior to the time the core actually issues a read request for it, the data should be available to the core in an internal cache. Write requests typically identify data that is being returned by the agent to system storage. The data may be evicted because the agent is no longer using it and new data is being read to a memory location that the evicted data occupied.

BRIEF DESCRIPTION OF THE DRAWINGS

The invention may best be understood by referring to the following description and accompanying drawings that are used to illustrated embodiments of the invention. In the drawings.

DETAILED DESCRIPTION

In the following description, specific details are set forth. However, it is understood that embodiments of the invention may be practiced without these specific details. In other instances, well-known circuits, structures and techniques have not been shown in detail in order to avoid obscuring the understanding of this description.

Figure 1:
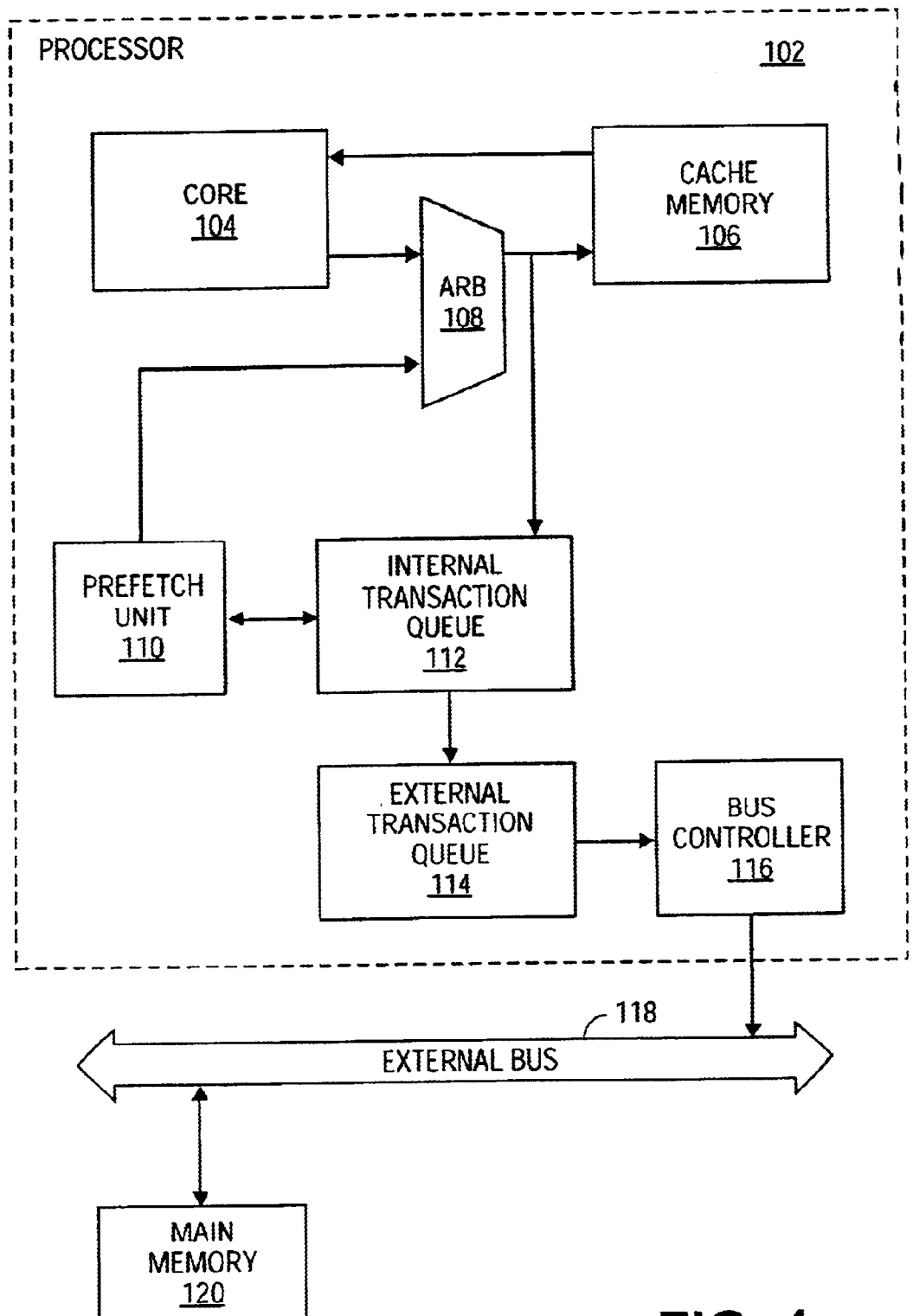
FIG. 1 shows a block diagram of an embodiment of a processor employing the present invention.

FIG. 1 depicts an embodiment of a processor 102 employing the present invention. The processor 102 includes, among other things, an execution core 104 and a transaction management system. The transaction management system receives requests from other components (e.g., core) of the processor and processes transactions to implement the requests. The transaction management system includes an arbiter 108, an internal cache memory 106, an internal transaction queue 112 and an external transaction queue 114. Numerous other functional elements of the processor 102 are, for clarity and brevity, not illustrated within FIG. 1. Rather, FIG. 1 merely illustrates a limited number of functional components sufficient to describe the operations of the external transaction queue 114 and the internal transaction queue 112 incorporated within the transaction management system.

An external bus 118 interconnects the processor 102 with other components such as other processors, memory controllers, interface chipsets, input/output devices and/or other integrated circuits that process data requests. In one embodiment, a main memory 120 is coupled to the external bus 118 via a memory controller (not shown). The main memory 120 may include a dynamic random access memory (DRAM); however, the main memory may have other configurations.

The arbiter 108 receives requests from a variety of inputs, such as from the core 104 and perhaps from other sources such as from the prefetch unit 110. Requests typically includes a request code representing the type of request being made and, where appropriate, an address identifying data on which the request is to be performed. The arbiter 108 may prioritize the requests and implements them in the order of priority.

The cache memory 106 may be an internal memory. Typically, the cache memory 106 may be a unified cache, one that stores both instruction data and variable data (collectively, "data"). Requests from the arbiter 108 may be input to both the cache memory 106 and to the internal transaction queue 112. For read requests, the cache 106 may include control logic that can determine whether the requested data is stored in the cache. If so, the request is said to "hit" the cache 106. The cache 106 will furnish the requested data to the core 104 over a communication path. Otherwise, the request is said to "miss" the cache 106. The cache 106 may communicate a hit or a miss to the internal transaction queue 112 over a line.

The internal transaction queue 112 may include control logic and buffer memory to process requests from the arbiter 108. Each request issued by the arbiter 108 is placed in the internal transaction queue 112. The internal transaction queue 112 also receives hit/miss indicators from the cache 106. If a request hits the cache, the internal transaction queue 112 permits the queued request to terminate as it advances out of the queue. But if a request misses the cache, the request should be completed by retrieving the requested data from an external memory. In this case, when the request advances out of the internal transaction queue 112, the internal transaction queue causes the request to be entered in the external transaction queue 114.

The external transaction queue 114 may interpret data requests received from the internal queue and generate external bus transactions to fulfill them. The external transaction queue 114 includes control circuitry and buffer memory to schedule transactions on the external bus 118 to process requests issued from within the processor 102. The external transaction queue 114 may control the operation of the external bus 118 via the external bus controller 116. Typically, a bus protocol will have been defined for the bus, the external transaction queue 114 and external bus controller 116 may generate and receive signals in accordance with such a protocol.

In one embodiment, a prefetch unit 110 is provided in the transaction management system. The prefetch unit 110 may monitor requests issued by the arbiter 108 and determine whether read requests exhibit one or more predetermined patterns. When a core issues a series of read requests to sequential memory locations (e.g., A, A+1, A+2, or B, B−1, B−2), it may indicate that the core is advancing through a regular, ordered progression of instructions or data. If any such pattern is identified, the prefetch unit 110 may issue a prefetch request. The prefetch request may be made prior to a core request for the same data. Prefetching may contribute to improved processor performance by having data stored in the internal cache prior to the time the core requests the data. If the data is present in the cache when the core needs the data, the core will not be forced to wait for an external bus transaction to complete before the core can use the data.

Although the processor may generate a wide variety of requests, only certain requests, such as prefetch, read and write requests, will be considered herein in detail. The external transaction queue 114 and the method by which the external transaction queue schedules the request transactions to be posted to the external bus is described in detail with reference to FIGS. 2–4.

Figure 2:
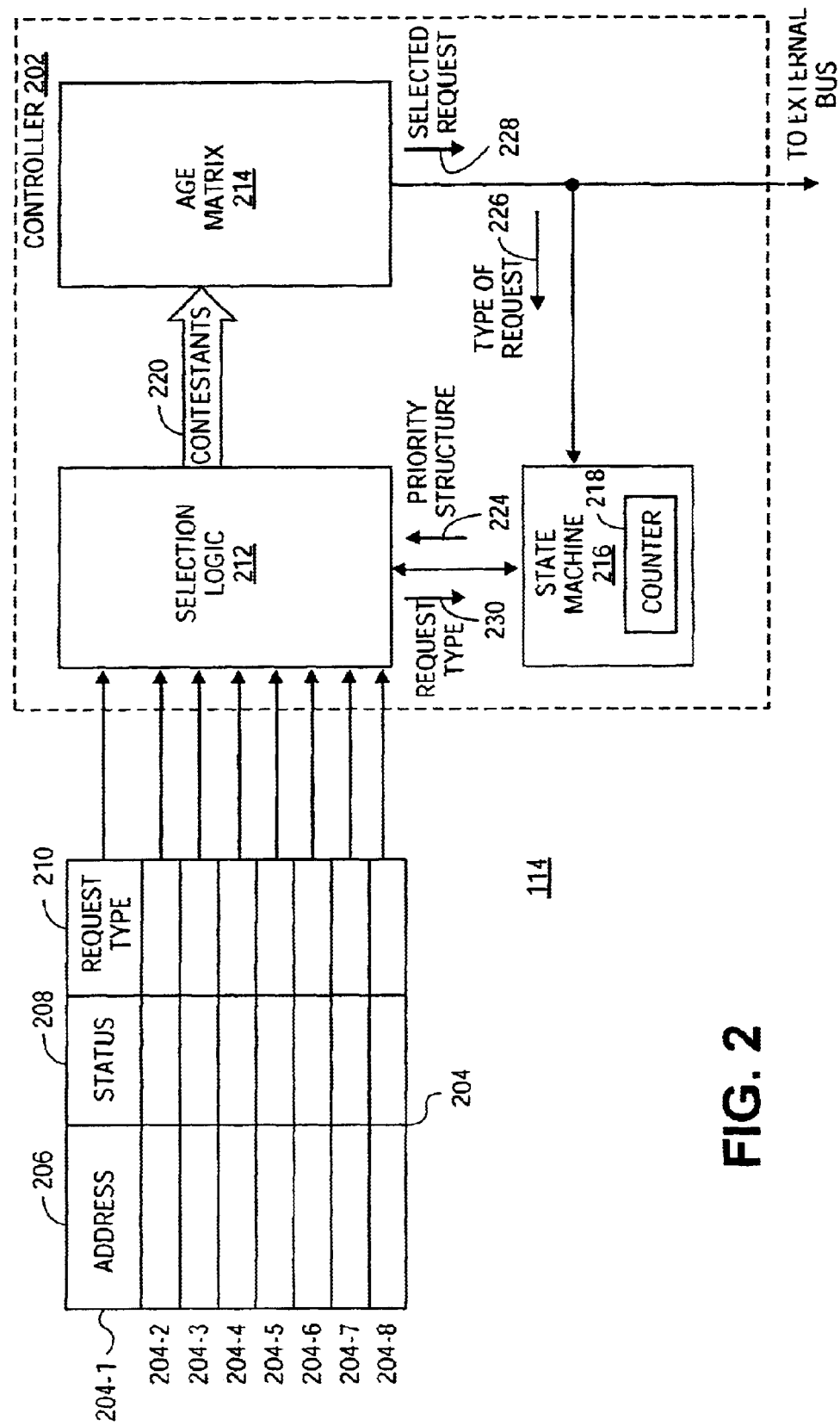
FIG. 2 shows a block diagram of an external transaction queue of a processor according to one embodiment of the present invention.

FIG. 2 depicts an external transaction queue 114 of a processor according to one embodiment of the present invention. The external transaction queue 114 includes, among other things, a controller 202 and a number of queue registers 204-1 through 204-8 (labeled 204 collectively). The controller 202 interfaces the queue registers 204 to other elements within the processor. Although eight queue registers are shown in FIG. 2, the principles of the present invention permit fewer or more registers as desired.

Each queue register 204 may be populated by a number of fields including an address field 206, one or more status fields 208 and a request type field 210. The address field 206 may identify a range of external memory addresses to which the requests are directed. The status field 208 may store administrative information regarding respective transactions. The status field 208 may identify the status of the transaction, for example, whether the transaction is waiting to be posted to the external bus, whether it has been posted, whether cache coherency results have been received for the transaction and whether the transaction has been completed. Typically, a transaction is cleared from a register when the status field indicates that the respective transaction has completed. The request type field 210 stores information relating to the type of requested transaction. For example, the request type field 210 may be marked to reflect which transaction is related to a read request, which transaction is related to a write request and which transaction is related to a prefetch request.

The controller 202 schedules the next transaction to be posted to the external bus and includes an age matrix 214, a selection logic 212 and a state machine 216. The state machine 216 determines a relative priority of each type of requests based on (1) the past history of transactions posted to the external bus and (2) the type of requests stored in the queue registers 204. Then, based on the priority structure 224 provided by the state machine 216, the selection logic 212 examines the entries in the queue registers 204 and selects the contestants for the age matrix 214. From the list of contestants provided by the selection logic 212, the age matrix 214 selects the oldest request. The selected request 228 gets posted to the external bus. Based on the request type information 226 of the selected request 228, a counter 218 in the state machine 216 is used to count the number of times certain request types have been posted to the external bus. The state machine 216 uses the count information as well as the information relating to the types of requests stored in the queue registers that have not yet been posted on the external bus to determine a relative priority of each type of requests. The operation of the state machine 216 and the method by which the relative priority of each type of request is determined is described in detail with reference to FIG. 4.

Figure 3:
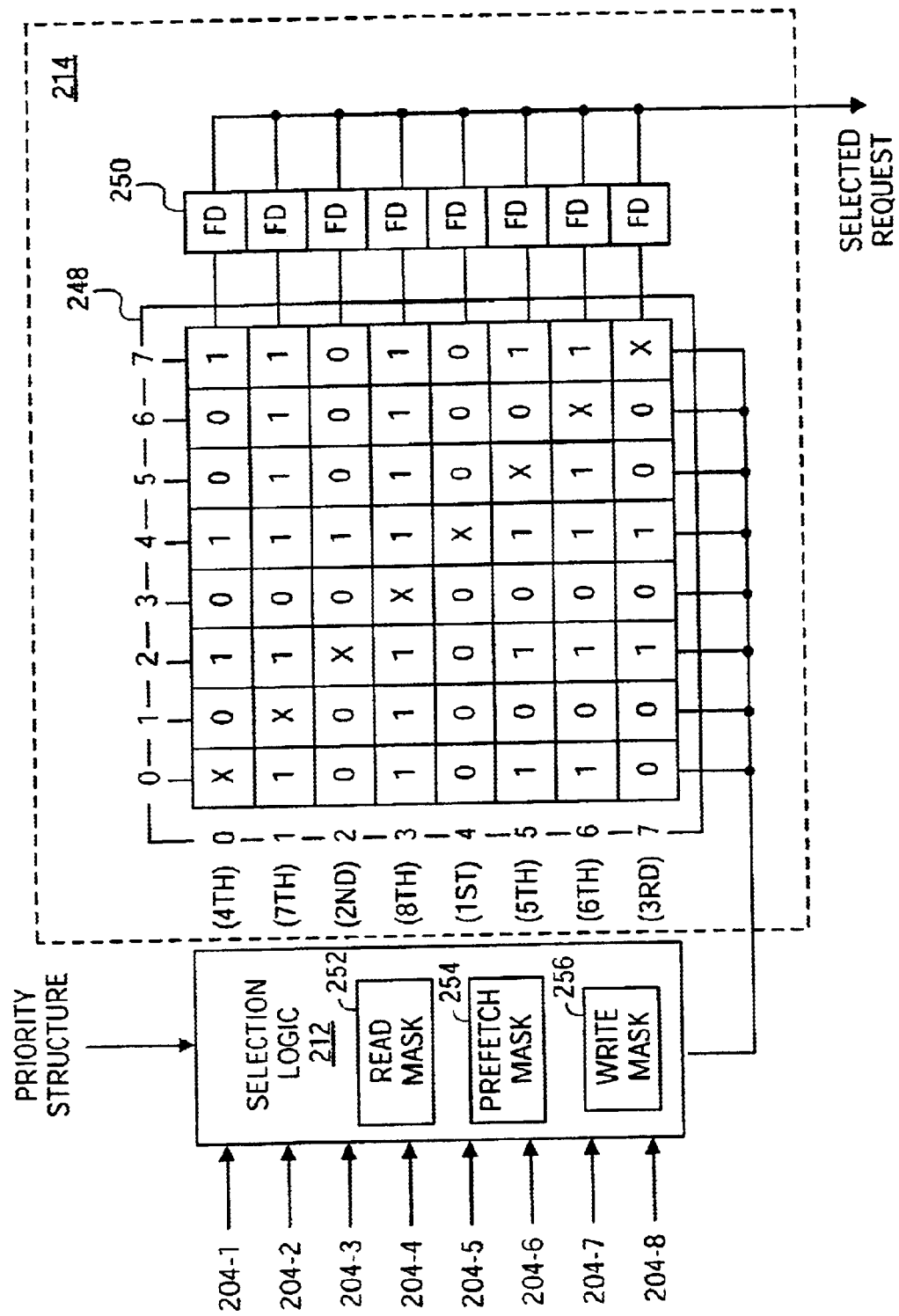
FIG. 3 shows a block diagram of a selection logic and age matrix arrangement of the external transaction queue according to one embodiment of the present invention.

FIG. 3 depicts a selection logic and age matrix arrangement of the external transaction queue according to one embodiment of the present invention to determine which one of the requests stored in the queue registers is selected to execute on the external bus. The age matrix 214 may be populated by an array 248, which identifies relative ages among the various requests stored in the queue registers 204-1 through 204-8. For an N queue registers, the age matrix 214 may include an N by N array. In one embodiment, the age matrix 214 is embodied in the form of a triangular age matrix. In triangular age matrix scheme, only half of the matrix has to be independently stored because if entry i is older than entry j, then entry j is not older than entry i. Referring to FIG. 3, Each position in the array 248 may store a flag representing a relative age between two registers. Rows of flags may be associated with respective registers. When flags are set in a row, it may indicate that other registers store requests that are older than the stored request associated with the respective row. Thus, in the example of FIG. 3, flags are shown as being set in row 0; this represents that a request stored in register 204-1 is younger than requests stored in registers 204-3, 204-5 and 204-8. In FIG. 3, the age order of the rows is shown parenthetically beside each row. In this example, the flags of row 4 identify the oldest stored request and flags of row 3 identify the youngest stored request.

In one embodiment, the age matrix 214 is embodied in the form of a triangular age matrix. In triangular age matrix scheme, only half of the matrix has to be independently stored because if entry i is older than entry j, then entry j is not older than entry i. In other words, since one half of the age matrix 248 is a mirror image of the other half, only half of the matrix may be employed by the external transaction queue.

The selection logic 212 may include a read mask 252, a prefetch mask 254 and a write mask 256. The read mask 252 may be populated by a plurality of flags, one for each register in the external transaction queue, which are used to identify read requests stored in the queue registers that have not yet been posted to the external bus. The prefetch mask 254 may be populated by a plurality of flags, one for each register in the external transaction queue, which are used to identify prefetch requests stored in the queue registers that have not yet been posted to the external bus. The write mask 256 may be populated by a plurality of flags, one for each register in the external transaction queue, which are used to identify write request stored in the queue registers that have not yet been posted to the external bus.

According to one embodiment, the selection logic 212 may be in communications with the flag positions in the respective columns of the array 248. The selection logic 212 may disable the flags in the columns of the array according to a relative priority structure presented by the state machine 216. For example, read request may be prioritized over prefetch requests and prefetch request may be prioritized over write requests. To implement this priority structure, the selection logic 212 may determine whether the read mask 252 stores any flags. If so, the read mask 252 is enabled and the other masks 254, 256 are disabled. The contents of the read mask 252 determine which flags in the array 248, if any, are disabled. More specifically, the flags of the read mask 252 determine which columns of flags are enabled and which columns of flags are disabled. As a result, those requests stored in the queue registers 204 that are not associated with the read request are disabled from the age matrix 214.

If the read mask 252 does not store any flags, the selection logic 212 determines whether the prefetch mask 254 stores any flags. If so, the prefetch mask 254 is enabled and the read mask 252 and the write mask 256 are disabled. The contents of the prefetch mask may be applied to the array to disable flags that are not associated with prefetch requests. If both the read mask 252 and the prefetch mask 254 do not store flags, the write mask 256 may be enabled. The contents of the write mask 256 may be applied to the array to disable flags that are not associated with write requests.

The age matrix 214 may include flag detectors 250, one for each row in the array. Each flag detector may receive a first input from the flag positions of its associated row in the array. A flag detector may generate an active output if it detects no flags in its associated row in the array. Only one flag detector should generate an active output. The active output signal identifies a stored request that should be scheduled next by the transaction queue.

The age matrix 214 maintains an account of the ages of requests stored throughout the queue registers. And various masks 252–256 permit the age matrix 214 to prioritize among those requests based upon request types, i.e., whether the requests are read request, prefetch requests or write requests. The age matrix 214 selects a winning request from the requests with highest priority.

Typically, an external bus transaction that reads data causes data of a predetermined unit size to be read to the processor. For example, a single bus transaction may cause 64 bytes of data to be read to the processor. This predetermined unit size often is referred to as a "cacheline." Different systems have different cacheline sizes. Thus, although a processor may require data of only a portion of a cacheline, the processor may read the entire cacheline. From the cacheline, the processor will use as much data as is required by its program flow.

Each bus clock can handle a transfer of a defined number of bytes. For example, each 64-byte cacheline may require two bus clock cycles to complete. Typically, a turnaround cycle is required when switching from reads to writes (or writes to reads). Because no data transfer is taking place on the bus during the turnaround cycle, the performance of the external bus is being wasted. Accordingly, alternating between reads and writes is typically less efficient than repeating the same type of requests. Thus, reads and writes may be grouped together to reduce turnaround cycles and improve overall memory access bandwidth. More specifically, if two consecutive read requests are posted to the external bus, no turnaround cycle is necessary and no dead cycle has been wasted. Similarly, if two writes are grouped together, then no dead cycle is wasted.

In accordance with an embodiment of the invention, read requests are grouped together and write requests are grouped together such that bus turnaround cycles are minimized and external bus utilization is improved. Such grouping of read requests and write requests may be accomplished by a state machine that assigns a relative priority for each type of requests based on past history of transactions posted to the external bus and the type of requests stored in the external transaction queue.

Figure 4:
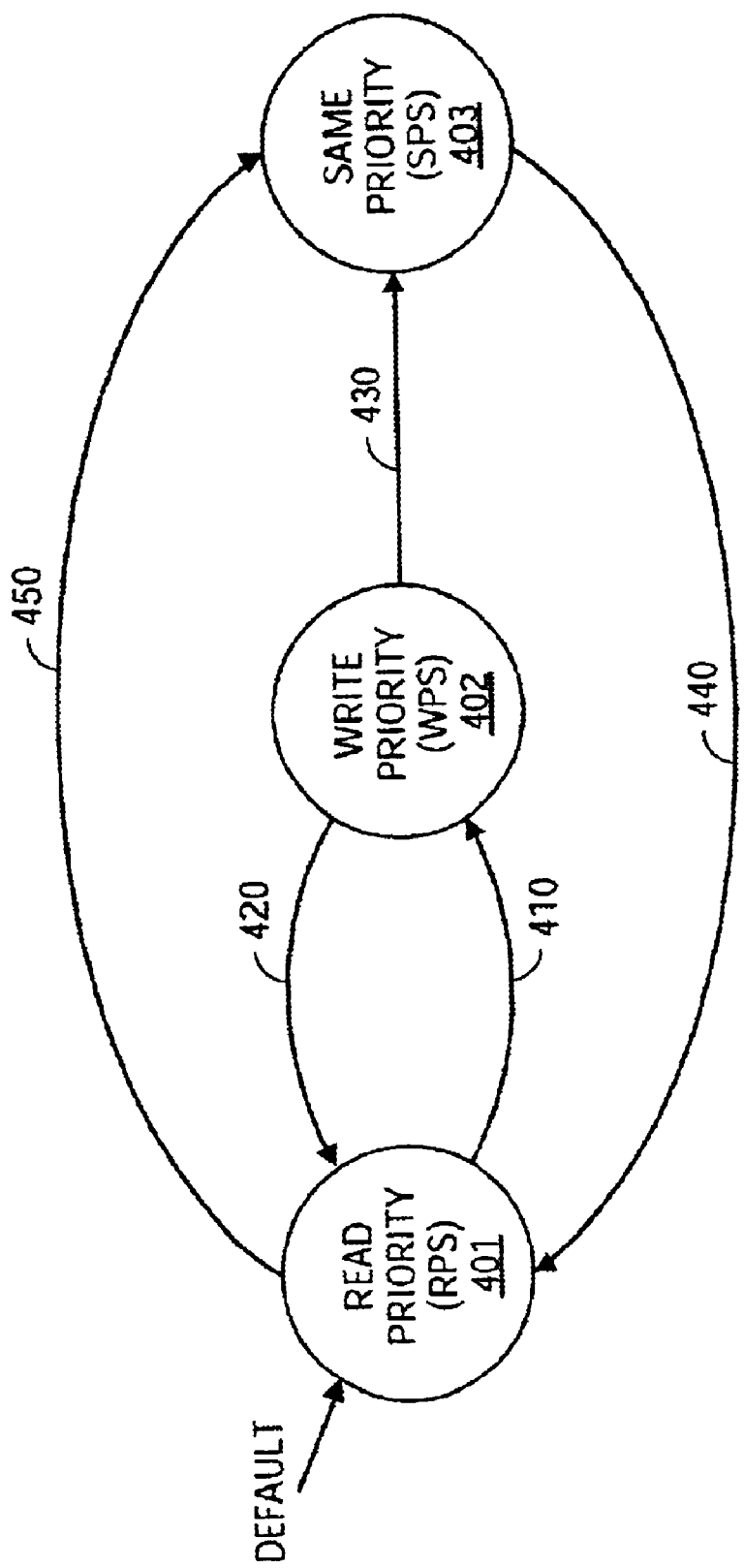
FIG. 4 shows a state diagram of a state machine incorporated into the external transaction queue according to one embodiment of the present invention.

FIG. 4 depicts a state diagram of a state machine incorporated into the external transaction queue according to one embodiment of the present invention. The state machine is used to assign a relative priority for each type of requests based on past history of transactions posted to the external bus and the type of requests currently stored in the external transaction queue. The state machine may include a counter to keep track of the number of times certain requests have been posted to the external bus.

The state machine includes the following states: read priority state (RPS) 401; write priority state (WPS) 402; and same priority state (SPS) 403. The state machine commences in a read priority state 401. In RPS 401, read requests have priority over prefetch requests and prefetch requests have priority over write requests. Under this priority structure, the selection logic 212 determines whether any of the queue registers 204 stores any non-posted read request. If so, the selection logic 212 may apply the read mask 252 to the array 248. When the read mask 252 is applied to the array 248, mask flags cause flags in the array to be disabled. Disabling an array flag prevents its associated flag detector 250 from receiving the flag even though the flag is set. The read mask 252 will prevent the flag detectors 250 associated with non-read requests from generating an active output signal. By applying the read mask 252 to the array 248, the age matrix 214 is able to identify the oldest read request stored in the queue register. And the flag detectors 250 will identify one of the queue registers as storing the next instruction to be scheduled.

If the queue registers 204 does not store any non-posted read requests, the selection logic 212 determines if there is any prefetch request stored in the queue registers. If so, the selection logic 212 may apply the prefetch mask 254 to the array 248 and select the oldest prefetch request in the queue registers 204 to be posted to the external bus.

If no read or prefetch requests are stored in the queue registers, the selection logic 212 may determine whether the queue registers store any non-posted write requests. If so, the selection logic 212 may apply the write mask to the array 248 and schedule the oldest write request stored in the queue registers to be posted to the external bus.

Accordingly, so long as the controller 202 remains in RPS 401 and there are read requests stored in the queue registers that have not yet been posted to the external bus, the external transaction queue 114 will continue to group read requests together. One concern with always preferring read requests over writes is that all the reads will be serviced first and the system will be clogged with nothing but writes. Often a bus agent such as a chipset posts write requests to write buffers and allows read requests to be reordered around these writes so long as no data conflict exists. Therefore, by always preferring read requests over writes, there is the possibility that write requests may never be executed, thus eventually running out of space in the write buffer. In which case, the read requests must wait until the write requests are pushed out of the write buffer and that may take a long time.

It has been found that a steady flow of writes posted to the external bus can improve external bus utilization. According to one embodiment, write requests are periodically posted to the external bus by assigning high priority to write requests. Write requests have priority over other requests in the write priority state (WPS) 402. More specifically, in WPS 402, write requests have priority over read requests and read requests have priority over prefetch requests.

In one embodiment, there are two conditions for transitioning from RPS 401 to WPS 402. First, if there are at least two write requests stored in the external transaction queue and four read requests have recently been posted to the external bus, the state will change from RPS 401 to WPS 402 as shown by arrow 410. Alternatively, if there is one write request stored in the external transaction queue and eight read requests have been posted to the external bus, the state changes to WPS 402 as shown by arrow 410. This condition is provided to avoid situations where, if there is only one write request stored in the external transaction queue and there are a long string of read requests, the write request could cause a read request to recycle for a long period of time.

According to one bus protocol, only two writes can be grouped together. If three writes are grouped together, a bubble (dead cycle) must be provided between the second write and the third write. Therefore, when grouping writes together, it is not useful to pack more than two writes together. If four writes are grouped together, a first bubble is required between the second and third writes and a second bubble is required between the third and fourth writes. This means that first two writes can be grouped together, but after that the external bus falls into a steady state of one write every three clock cycles. In which case, one third of the external bus resource is wasted by the bubble.

In one embodiment, when grouping write requests together, only up to two write requests are grouped together if there are read requests pending in the external transaction queue. Accordingly, once in WPS 402, the state will change to RPS 491 as shown by arrow 420 after two writes have been posted to the external bus and if there is at least one read or prefetch request stored in the external transaction queue. Alternatively, the state will change from WPS 402 to RPS 401 as shown by arrow 420 if there is no write request stored in the external transaction queue.

When the state machine transitions between the RPS 401 and WPS 402, high priority is assigned to either the read requests or the write requests depending on whether the state machine is in RPS 401 or WPS 402. This means that prefetch requests are not assigned to be high priority in both the RPS 401 and WPS 402. Because a prefetch request could be blocking some other request, a same priority state (SPS) 493 is provided in which all requests, e.g., read, prefetch and write requests, will have equal priority. Accordingly, in SPS 403, the oldest request in the external transaction queue will get posted to the external bus. Therefore, if a prefetch request has been stored in the external transaction queue for a long period of time, SPS 493 guarantees that such request will get posted to the external bus.

The state machine will transition into SPS 403 as shown by arrows 430 and 450 if a defined number transactions (e.g., 32 transactions) have been issued since the external transaction queue has been empty and no prefetch request has been issued and there is at least one prefetch request stored in the external transaction queue. A counter is used to count the number of transactions that have been issued and the counter is reset when the external transaction queue is empty. SPS 403 guarantees that a prefetch request will not sit in the queue for more than 32 transactions and that there will be no deadlock in the system. Although 32 transactions are used in the described embodiment, the principles of the present invention permits use of different number of transactions to guarantee that a prefetch request will be serviced every defined number of cycles. The state machine will remain in SPS 403 only for one transaction. Accordingly, the state changes back to RPS 401 as shown by arrow 440 once one request has been posted to the external bus.

Accordingly, an embodiment of the external transaction queue provides a controller that periodically switches priority between read requests and write requests in order to prevent write requests from accumulating in the queue registers. In one embodiment, the external transaction queue is configured to post at least one write request to an external bus every eight transactions if at least one non-posted write request is stored in the queue registers.

In general, there are about twice as many reads than writes. Therefore, it has been found that the external bus utilization may be improved by sustaining a pattern of alternating between four consecutive read requests and two consecutive write requests. Accordingly, in one implementation, the external transaction queue attempts to sustain (if possible) a pattern of four consecutive read requests followed by two consecutive write requests by periodically switching priority between read and write requests.

In one embodiment, when the external transaction queue 114 is full, the internal transaction queue 112 cannot pass any more requests into the external transaction queue. The external transaction queue 114 may include a kill mechanism to remove speculative requests (e.g., prefetches) from its queue registers to free up space for other requests from the internal transaction queue 112. In one implementation, the kill mechanism may be invoked only if the eternal transaction queue 114 is full and if a non-speculative request (e.g., read or write) is the next request scheduled to be forwarded from the internal transaction queue. Consequently, if a speculative request is the next request scheduled to be forwarded to the external transaction queue 114, the kill mechanism in the external transaction queue will not be invoked.

According to an embodiment of the present invention, if there is a non-speculative request scheduled behind a speculative request in the internal transaction queue 112, the non-speculative request will bubble up to the top of the queue, i.e., the non-speculative request will be the next request scheduled to be forwarded to the external transaction queue 114. By doing so, the external transaction queue 114 can detect that a non-speculative request is being forwarded from the internal transaction queue so that the kill mechanism may be invoked to free up registers and allow additional requests to be passed from the internal transaction queue 112.

The internal transaction queue 112 and the method by which the internal transaction queue schedules the request transactions to be forwarded to the external transaction queue 114 is described in detail with reference to FIGS. 5–7. With respect to the internal transaction queue 112, only certain requests, such as speculative requests (e.g., prefetches), non-speculative requests (e.g. reads and writes), are considered in detail.

Figure 5:
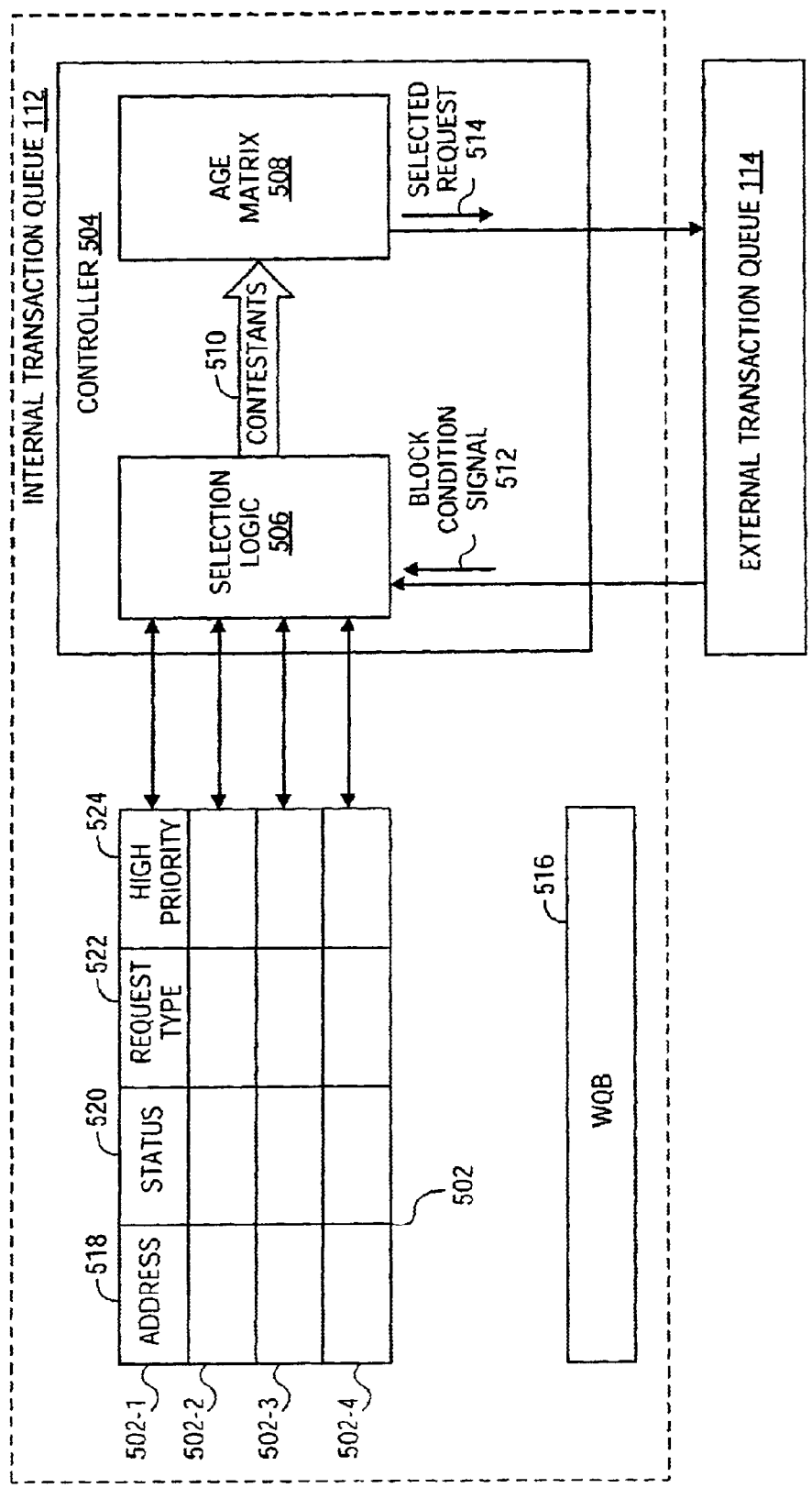
FIG. 5 shows a block diagram of an internal transaction queue of a processor according to one embodiment of the present invention.

FIG. 5 depicts the internal transaction queue 112 of a processor according to one embodiment of the present invention. The internal transaction queue 112 includes, among other things, a controller 504 and a number of general-purpose queue (GPQ) registers 502-1 through 502-4 (labeled 502 collectively). The controller 504 interfaces the queue registers 502 to other elements within the processing, including the external transaction queue 114. Although four queue registers 502 are shown in FIG. 5, the principles of the present invention permits fewer or more registers as desired.

Each queue register 502 may be populated by a number of fields including an address field 518, a status field 520, a request type field 522 and a high priority field 524. The address field 518 may identify a range of external memory addresses to which the requests are directed. The status field 520 may store administrative information regarding respective transactions. The request type field 522 stores information relating to the type of transaction requested. The high priority field 524 stores information relating to the relative priority of requests. When a request is allocated in the internal transaction queue 112, the high priority field 524 is initially set such that non-speculative requests are treated as high priority and speculative requests are treated as low priority. However, the priority of a speculative request may be dynamically elevated while it is waiting in the queue register 502 to high-priority if it is causing a conflict with a non-speculative request. By examining the request type field 522, the internal transaction queue 112 may determine which transaction is related to a non-speculative request and which transaction is related to a speculative request.

The controller 504 incorporated in the internal transaction queue 112 schedules the next transaction to be forwarded to the external transaction queue 114. A priority logic is implemented in the controller 504 to dispatch requests to the external transaction queue 114 based on a relative priority structure. In one embodiment, non-speculative requests (i.e., requests initiated by the core) are prioritized over speculative requests so that the non-speculative requests would bubble up to the top of the queue over the speculative requests. By doing so, the external transaction queue 114 may determine, when it is full, that the internal transaction queue 112 is trying to pass a non-speculative request and trigger its kill mechanism to free up register spaces.

In one embodiment, the controller 504 includes, among other things, an age matrix 508 and a selection logic 506. The selection logic 506 examines the entries in the queue registers 502 and selects the contestants 510 for the age matrix 508 based on information stored in the request type field 522 and the high priority field 524. From the list of contestants 510 provided by the selection logic 506, the age matrix 508 selects the oldest request. The selected request 514 gets forwarded to the external transaction queue 114.

According to an embodiment of the present invention, a priority inversion logic is provided in the internal transaction queue 112 to dynamically change the priority of a request while the request is waiting in the queue. In one embodiment, if a low-priority request stored in the internal transaction queue 112 is causing a high-priority request to be recycled in the execution pipeline, then the low-priority request will inherit the high-priority of the request that it is blocking. When a request is allocated in the queue registers 502, the high priority field 524 is initially set such that non-speculative requests are treated as high priority and speculative requests are treated as low priority. However, in accordance with one embodiment, the priority of a speculative request is dynamically elevated to high-priority if it is causing a conflict with a non-speculative request coming through the pipeline. The priority inversion logic may receive an address conflict information from a conflict detection logic which determines if there is a request stored in the queue registers that is causing another request to get recycled in the pipeline. The conflict detection logic may examine a section of the address fields to determine if the addresses associated with the requests are to the same cacheline.

In operation, when a prefetch request to address A is allocated in the internal transaction queue 112, it is assigned a low priority because it is a speculative request. During subsequent cycles, if a non-speculative request to address B is allocated in the internal transaction queue 112, it is assigned a high priority because it is a non-speculative request. Even though the prefetch request came in first, if they are both waiting for servicing by the external transaction queue 114, the internal transaction queue 112 will present the non-speculative request to address B to the external transaction queue 114 when one of the entries in the external transaction queue 114 becomes available, because the non-speculative request has higher priority than the prefetch request. Then, the core dispatches a core read request to address A. The read to address A is assigned a high priority because it is a non-speculative request. Because the prefetch requests are initially assigned low priority, the prefetch requests can be delayed until the core actually wants the data. In this case, if the prefetch to address A is not completed by the time the core actually needs the data (i.e., when it issues a core read request to address A), an address conflict will be detected by the conflict detection logic. Once an address conflict has been detected, a recycle mechanism would cause the read request to address A to get recycled in the execution pipeline. In such cases, the priority inversion logic will elevate the priority of the prefetch request that is causing the high-priority non-speculative request to recycle. By elevating the priority of the prefetch request, the prefetch request causing the conflict will be serviced by the external transaction queue 114 prior to high priority requests stored in the queue registers 502 that are younger than the prefetch request.

According to an embodiment of the present invention, order-dependent transactions stored in the internal transaction queue 112 are blocked from the contestant selection process based on a block signal 512 received from the external transaction queue 114. In general, certain write transactions or requests equivalent to write transactions have to ordered. By looking at request type, the controller 504 may determine whether a request stored in the queue register 502 is order-dependent or order-independent.

In one embodiment, to prevent the transaction management system from reordering the order-dependent transactions, the external transaction queue 114 is configured to generate a block signal 512 indicating that it is not accepting order-dependent transactions. In this regard, if the external transaction queue 114 has a number of empty registers but is not currently accepting requests from the internal transaction queue 112 because of ordering issues, the internal transaction queue 112 may select only the order-independent transactions to be prioritized by the age matrix and forward the selected request to the external transaction queue. By processing order-independent transactions when a blocking condition has been asserted, the internal transaction queue 112 can proceed with the next order-independent transaction without having to wait for the block condition to be deasserted.

For example, if the internal transaction queue 112 is storing a mixture of reads and RFOs (read for ownership which represents a write) and if the external transaction queue 114 is blocking RFOS (i.e., because it is not accepting order-dependent transactions), then read requests stored in the internal transaction queue may still be serviced by the external transaction queue even if the RFOs are older. By incorporating an age matrix 508 into the controller 504 of the internal transaction queue 112, the controller 504 is able to selectively allow certain types of the requests to go through and get serviced by the external transaction queue 114 when the system is busy servicing other types of requests.

When the external transaction queue 114 is ready to accept order-dependent requests, the age matrix 508 preserves the order within each subclass of requests stored in the queue registers 502 and waiting to be serviced by the external transaction queue 114. For example, the queue registers 502 may store a number of write requests that are order-dependent. Because the order-dependent write requests enter the age matrix 508 under the same condition, the age matrix 508 will select the write requests in order, i.e., oldest one first, and present the oldest request in that subclass to the external transaction queue 114.

According to an embodiment of the present invention, the internal transaction queue further includes a writeback queue (WBQ) register 516 for handling eviction requests generated by the external transaction queue 114. For example, if a read misses the cache 106 and the memory location for the data has been modified data, the external transaction queue 114 may generate an eviction request to evict the cacheline in order to make space for the new data. The eviction signal generated by the external transaction queue 114 is forwarded to the internal transaction queue 112 via the arbitor 108 and gets allocated in the WBQ register 516. In one implementation, the eviction request allocated in the WBQ register 516 has priority over requests in the GPQ registers 502.

Figure 6:
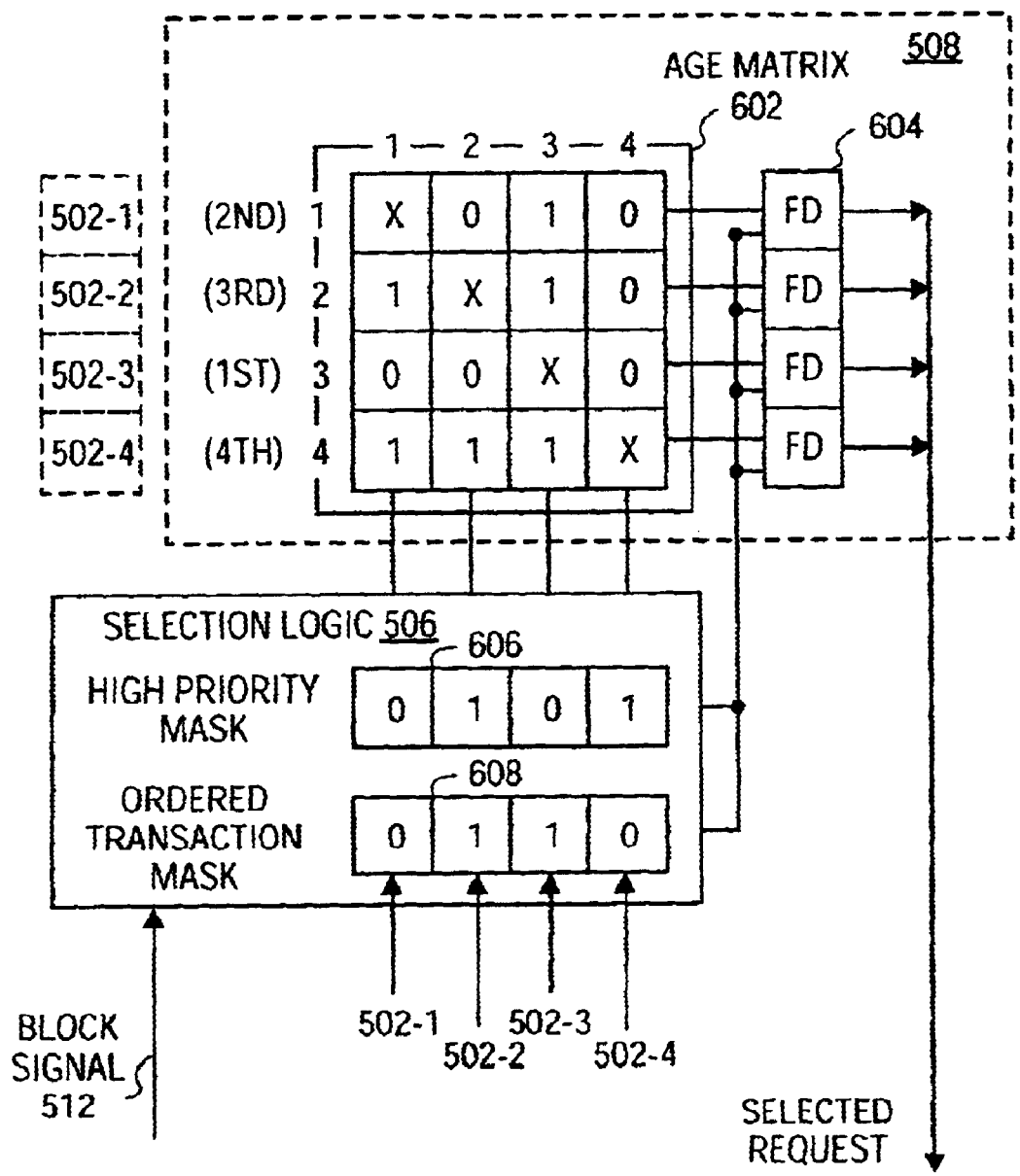
FIG. 6 shows a selection logic and age matrix arrangement of the internal transaction queue according to one embodiment of the present invention.

FIG. 6 depicts the selection logic and age matrix arrangement of the internal transaction queue according to one embodiment of the present invention to determine which one of the requests stored in the queue registers 502 is selected to be forwarded to the external transaction queue 114. The age matrix 508 may be populated by an array 602, which identifies relative ages among the various requests stored in the queue registers 502-1 through 502-4. For an N queue registers, the age matrix 508 may include an N by N array. Each position in the array may store a flag representing a relative age between two registers. Rows of flags may be associated with respective registers. When flags are set in a row, it may indicate that other registers store requests that are older than the stored request associated with the respective row. Thus, in the example of FIG. 6, flags are shown as being set in row 1, this represents that a request stored in register 502-1 is younger than the request stored in register 502-3. In FIG. 6, the age order of the rows is shown parenthetically beside each row. In this example, the flags of row 3 identify the oldest stored request and flags of row 4 identify the youngest stored request.

The selection logic 506 may include a high priority mask 606 and an ordered transaction mask 608. The high priority mask 606 may populated by a plurality of flags, one for each register in the external transaction queue. Each position in the high priority mask 606 may be associated with a respective column in the array 602. Flags in the high priority mask 606 may identify which of the queue registers 502 store high priority requests. The flags in the high priority mask 606 may be set based on information provided in the high priority fields 524 of the queue registers 502. The ordered transaction mask 608 may populated by a plurality of flags, one for each register in the external transaction queue, which are used to identify order-dependent requests stored in the queue registers 502. The flags in the ordered transaction mask 608 may be set by examining the request type fields 522 of the queue registers 502. By examining the request type fields 522, the selection logic 506 may identify which transaction is related to an order-independent request and which transaction is related to an order-dependent request.

According to one embodiment, the selection logic 506 may be in communications with the flag positions in the respective columns of the array 602. The selection logic 506 may disable the flags in the columns of the array 602 according to the masks 606 and 608. To prioritize high-priority requests over low-priority requests, the selection logic 506 may determine whether the high-priority mask 606 stores any flags. If so, the contents of the high-priority mask 606 determine which flags in the array, if any, are disabled. More specifically, the flags of the high-priority mask 606 determine which columns of flags are enabled and which columns of flags are disabled. As a result, those requests stored in the queue registers that are not associated with the high-priority requests are disabled from the age matrix 508.

In one embodiment, the selection logic 506 may determine whether a block condition signal 512 is asserted by the external transaction queue 114. If so, the contents of the ordered transaction mask 608 may be applied to the array 602 to disable flags associated with order-dependent transactions.

The age matrix 608 may include flag detectors 604, one for each row in the array. Each flag detector 604 may receive a first input from the flag positions of its associated row in the array 602. Each flag detector 604 may also receive an input from a predetermined flag position of each of the masks 606, 608. A flag detector 604 may generate an active output if it detects no flags in its associated row in the array. Only one flag detector should generate an active output. The active output signal identifies a stored request that should be forwarded next to the external transaction queue.

Consider the example shown in FIG. 6. Assuming that a block condition signal 512 is not asserted. In this case, when the high priority mask 606 is applied to the array 602, mask flags may cause the flags in the respective columns of the array 602 to be disabled. The high priority mask 606 prevents the flag detector 604 from identifying row 3 as the oldest request because row 3 is not associated with a high priority transaction. The second oldest request, identified by row 1, also is not high priority. Therefore the high priority mask will prevent the flag detector 604 associated with row 1 from generating an active output signal. The request selected by the age matrix 508 is third oldest overall. It is identified by row 2. Thus, the flag detectors 604 should identify the queue register 502-2 as storing the next instruction to be forwarded to the external transaction queue.

However, if the block condition signal 512 is asserted, then the ordered transaction mask 608 is applied to the array 602, causing the flags in the columns 1 and 2 of the array 602 to be disabled. The ordered transaction mask will prevent the flag detector 604 from identifying row 2 as the oldest request because row 2 is associated with a order-dependent transactions. And the age matrix 508 will select request stored in the queue register 502-4 as storing the next instruction to be forwarded to the external transaction queue.

Figure 7:
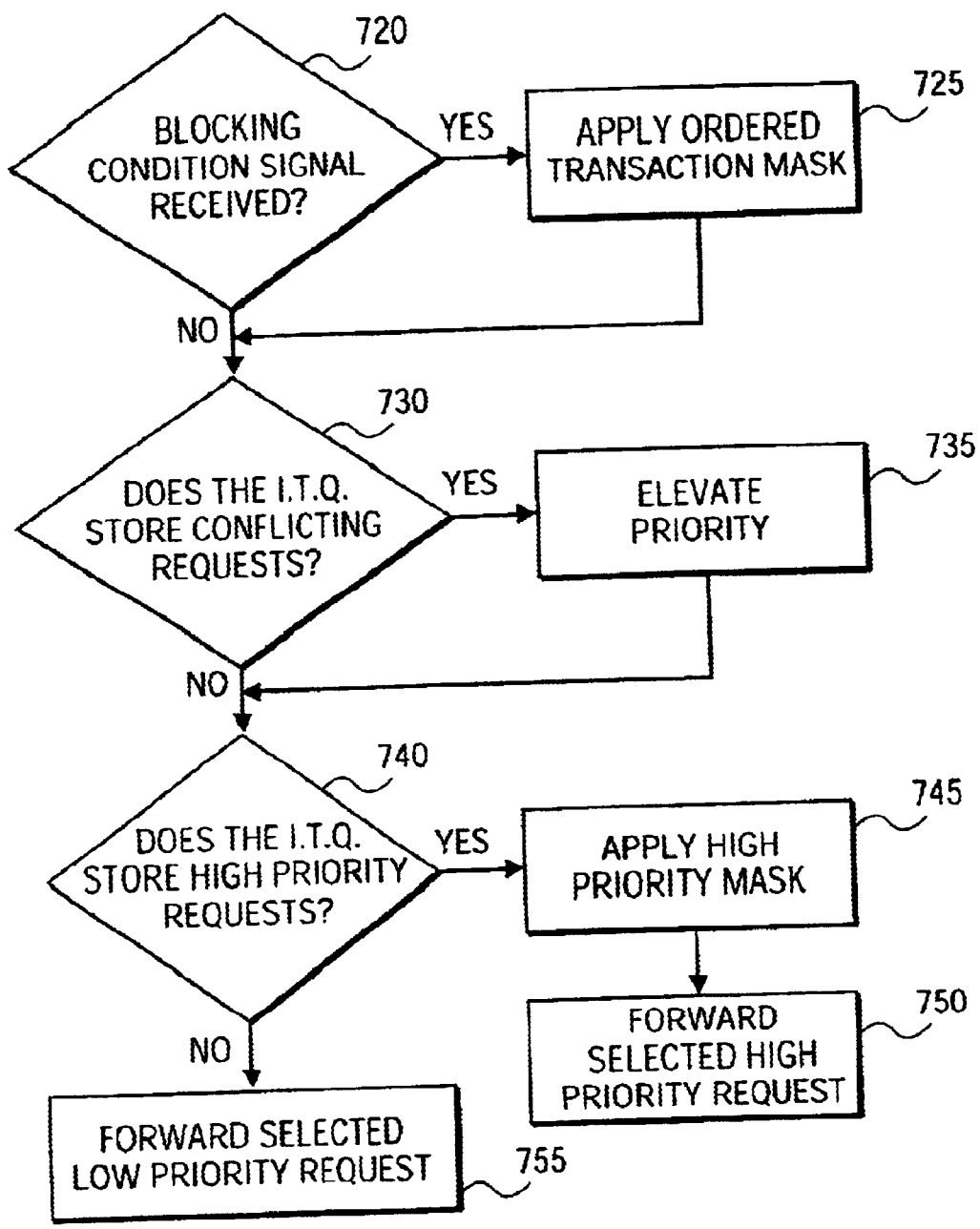
FIG. 7 shows a flowchart of operations of an internal transaction queue according to one embodiment of the present invention.

FIG. 7 depicts operations of the internal transaction queue 112 according to one embodiment of the present invention.

When the internal transaction queue 112 determines to schedule a new request to be forwarded to the external transaction queue 114, it determines whether a block condition signal 512 has been asserted by the external transaction queue (block 720). If so, the internal transaction queue 112 may apply the ordered transaction mask 608 to the array 602 to disable flags in the array that are associated with order dependent transactions (block 725). Then at block 730, the internal transaction queue 112 may determine whether the queue registers 502 stores any conflicting requests. If so, the internal transaction queue 112 may bump up the priority of the request causing the conflict (block 735).

Then at block 740, the internal transaction queue 112 may determine whether the queue registers 502 store any high priority requests which are not blocked ordered requests. If so, the internal transaction queue 112 may apply the high priority mask 606 to the array (block 745) to disable flags in the array that are associated with low priority requests. The internal transaction queue 112 then schedules the oldest high priority request stored in the queue registers 502 to be forwarded to the external transaction queue (block 750). If the internal transaction queue 112 does not store any high priority requests, it will schedule the oldest low priority request stored in the queue registers 502 to be forwarded to the external transaction queue (block 755).

While the invention has been described in terms of several embodiments, those skilled in the art will recognize that the invention is not limited to the embodiments described, but can be practiced with modification and alternation within the spirit and scope of the appended claims. The description is thus to be regarded as illustrative instead of limiting.

What is claimed is:

1. A processor comprising:
    an execution core to process read requests and write requests;
    a prefetch unit to process prefetch requests; and
    a transaction management system coupled to said execution core and said prefetch unit to schedule read, prefetch and write requests generated thereby, said transaction management system including a plurality of queue registers to store a plurality of requests, and a controller to post at least one write request to an external bus every defined number of transactions if at least one non-posted write request is stored in the queue registers.

2. The processor of claim 1, wherein said controller schedules external bus transaction such that two consecutive write requests are posted to the external bus after four read requests have been posted to the external bus if at least two non-posted write requests are stored in the queue registers.

3. The processor of claim 1, wherein said controller schedules external bus transactions such that at least one write request is posted to the external bus every eight transactions if at least one non-posted write request is stored in the queue registers.

4. The processor of claim 1, wherein said controller posts at least one write request to the external bus after eight read requests have been posted to the external bus if at least one non-posted write request is stored in the queue registers.

5. The processor of claim 1, wherein said controller comprises a priority generating logic to generates a relative priority for each type of request and a selection logic to schedules requests to be posted to the external bus based on said relative priority.

6. The processor of claim 5, wherein said controller further comprises an age matrix to maintain an account of the ages of requests stored in the queue registers and masks to permit the age matrix to prioritize among those requests based upon request types.

7. The processor of claim 6, wherein said age matrix is embodied in the form of a triangular age matrix.

8. The processor of claim 6, wherein said controller generates priority based on (1) past history of request transactions posted to the external bus and (2) type of requests stored in the queue registers.

9. The processor of claim 1, wherein each request causes a cacheline of data to transfer via the external bus.

10. A system comprising:
    a main memory to store a plurality of data elements; and
    a processor coupled to said main memory via an external bus, said processor including an execution core to process read requests and write requests and a plurality of queue registers to store a plurality of requests, said processor including a controller coupled to said plurality of queue registers to schedule external bus transactions requesting data to be written to said main memory or requesting data to be read from said main memory, wherein said controller posts at least one write request to said external bus every defined number of transactions if at least one non-posted write request is stored in the queue registers.

11. The system of claim 10, wherein said processor further comprises a prefetch unit to process prefetch requests.

12. The system of claim 10, wherein said controller schedules external bus transactions such that at least one write request is posted to the external bus every eight transactions if at least one non-posted write request is stored in the queue registers.

13. The system of claim 10, wherein said controller posts at least two consecutive write requests to the external bus after four read requests have been posted to the external bus if at least two non-posted write requests are stored in the queue registers.

14. The system of claim 10, wherein said controller posts at least one write request to the external bus after eight read requests have been posted to the external bus if at least one non-posted write request is stored in the queue registers.

15. The system of claim 10, wherein said controller comprises a priority generating logic to generates a relative priority for each type of request and a selection logic to schedules requests to be posted to the external bus based on said relative priority.

16. The system of claim 15, wherein said controller further comprises an age matrix to maintain an account of the ages of requests stored in the queue registers and masks to permit the age matrix to identify the oldest request among those requests chosen based upon request types.

17. The system of claim 15, wherein said controller generates priority based on (1) past history of request transactions posted to the external bus and (2) type of requests stored in the queue registers.

18. The system of claim 15, wherein said controller periodically assigns priority to write requests to prevent write requests from accumulating in the queue registers.

19. The system of claim 10, wherein each request causes a cacheline of data to transfer via the external bus.

20. A method comprising:
    storing a plurality of requests;
    scheduling external bus transactions for an agent that processes read requests, prefetch requests and write requests such that at least one write request is posted to an external bus every defined number of transactions if at least one write request is stored.

21. The method of claim 20, wherein said external bus transactions are scheduled such that at least one write request is posted to an external bus every eight transactions if at least one non-posted write request is stored in the queue registers.

22. The method of claim 20, further comprising posting at least two consecutive write requests to the external bus after four read requests have been posted to the external bus if at least two non-posted write requests are stored in queue registers.

23. The method of claim 20, further comprising posting at least one write request to the external bus after eight read requests have been posted to the external bus if at least one non-posted write request is stored in queue registers.

24. The method of claim 20, further comprising generating a relative priority for each type of request and scheduling requests to be posted to the external bus based on said relative priority.

25. The method of claim 24, wherein said priority for each type of request is generated based on (1) past history of request transactions posted to the external bus and (2) type of requests stored in the queue registers.

26. The method of claim 20, wherein each request causes a cacheline of data to transfer via the external bus.

* * * * *